United States Patent
Campbell et al.

(10) Patent No.: US 8,206,087 B2
(45) Date of Patent: Jun. 26, 2012

(54) SEALING ARRANGEMENT FOR TURBINE ENGINE HAVING CERAMIC COMPONENTS

(75) Inventors: Christian X. Campbell, Orlando, FL (US); Gary B. Merrill, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1362 days.

(21) Appl. No.: 12/101,412

(22) Filed: Apr. 11, 2008

(65) Prior Publication Data

US 2011/0008154 A1 Jan. 13, 2011

(51) Int. Cl.
*F01D 25/28* (2006.01)
(52) U.S. Cl. .......... 415/139; 416/500
(58) Field of Classification Search ......... 415/139, 415/170.1, 173.1, 214.1, 230, 231; 416/500; 277/641, 652, 654
See application file for complete search history.

(56) References Cited

U.S. PATENT DOCUMENTS

| | | | |
|---|---|---|---|
| 3,966,353 A | 6/1976 | Booher, Jr. et al. | |
| 4,111,603 A | 9/1978 | Stahl | |
| 4,326,835 A | 4/1982 | Wertz | |
| 4,417,854 A | 11/1983 | Cain et al. | |
| 4,768,924 A | 9/1988 | Carrier et al. | |
| 5,088,888 A * | 2/1992 | Bobo | 415/170.1 |
| 5,301,595 A | 4/1994 | Kessie | |
| 5,509,669 A * | 4/1996 | Wolfe et al. | 277/654 |
| 5,630,700 A | 5/1997 | Olsen et al. | |
| 5,716,052 A * | 2/1998 | Swensen et al. | 277/647 |
| 5,762,472 A | 6/1998 | Pizzi et al. | |
| 5,975,844 A | 11/1999 | Milazar et al. | |
| 6,000,906 A | 12/1999 | Draskovich | |
| 6,312,218 B1 | 11/2001 | Beeck et al. | |
| 6,565,322 B1 | 5/2003 | Lieser et al. | |
| 6,758,653 B2 | 7/2004 | Morrison | |
| 6,808,363 B2 | 10/2004 | Darkins, Jr. et al. | |
| 6,821,085 B2 | 11/2004 | Darkins, Jr. et al. | |
| 6,896,484 B2 | 5/2005 | Diakunchak | |
| 6,968,615 B1 | 11/2005 | More et al. | |
| 6,997,673 B2 | 2/2006 | Morris et al. | |
| 7,052,235 B2 * | 5/2006 | Alford et al. | 415/173.1 |
| 7,175,387 B2 | 2/2007 | Kreis et al. | |
| 7,500,833 B2 * | 3/2009 | Bublath et al. | 416/241 B |
| 7,798,769 B2 * | 9/2010 | Keller | 415/135 |
| 2005/0242526 A1 | 11/2005 | Dahlke et al. | |
| 2007/0258809 A1 | 11/2007 | Mazzola et al. | |

FOREIGN PATENT DOCUMENTS

| | | |
|---|---|---|
| EP | 1591725 A2 | 11/2005 |
| JP | 10103014 A | 4/1998 |
| WO | 03032420 A2 | 4/2003 |

* cited by examiner

*Primary Examiner* — Edward Look
*Assistant Examiner* — Andrew C Knopp

(57) ABSTRACT

A sealing arrangement for use in a turbine engine having ceramic components. The sealing arrangement is retained in a seal gap formed between adjacent segments and is compliant to accommodate variations in the size of the seal gap as the adjacent segments move relative to one another.

19 Claims, 4 Drawing Sheets

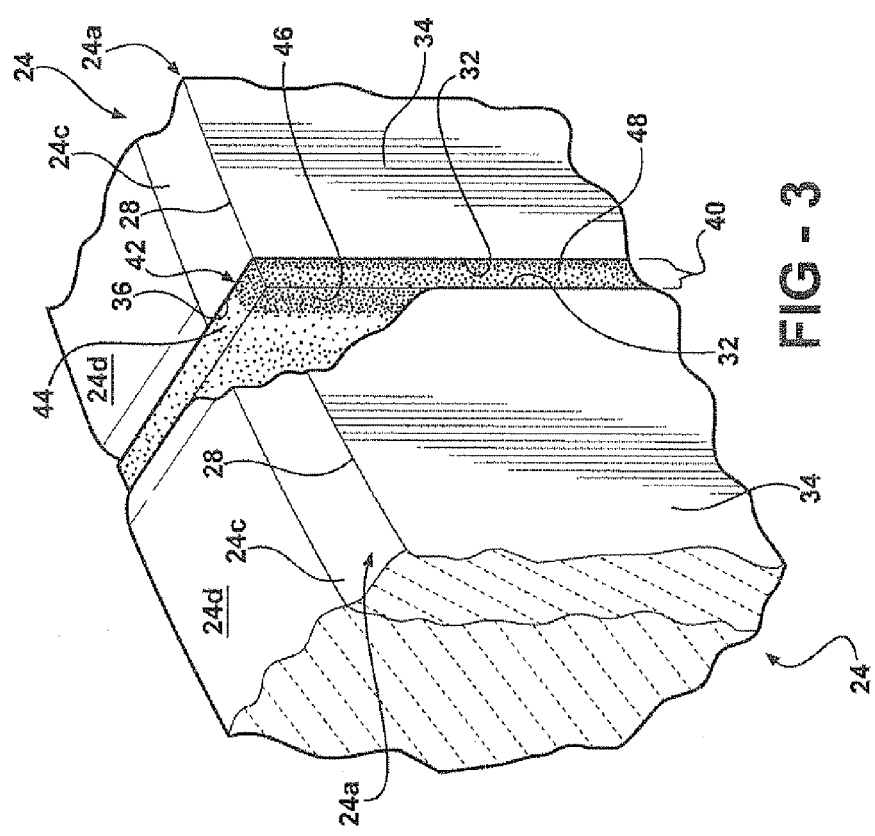
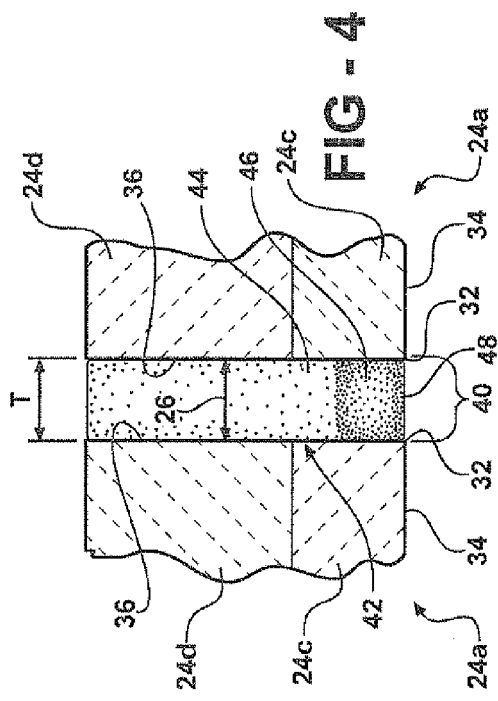
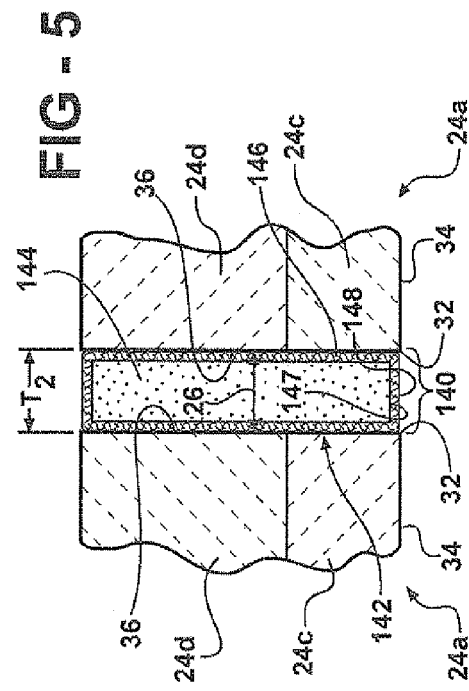

SEALING ARRANGEMENT FOR TURBINE ENGINE HAVING CERAMIC COMPONENTS

FIELD OF THE INVENTION

The present invention relates generally to a sealing arrangement for use in a turbine engine having ceramic components, and more particularly, to a sealing arrangement that is retained in a gap formed between adjacent segments for limiting passage of gases through the gap.

BACKGROUND OF THE INVENTION

In multistage rotary machines used for energy conversion, a fluid is used to produce rotational motion. In a gas turbine engine, for example, a gas is compressed in a compressor and mixed with a fuel source in a combustor. The combination of gas and fuel is then ignited for generating combustion gases that are directed to turbine stage(s) to produce rotational motion.

Typically, a plurality of non-rotating vane components and a plurality of rotating blade components are assembled circumferentially about an axial flow path of the engine. The vane and blade components include shroud segments that are mounted circumferentially about the axial flow path and support the respective vane and blade components. The shroud segments are typically disposed adjacent to each other in the circumferential direction such that small gaps are formed therebetween.

An outer case that surrounds the axial flow path typically includes ring segment components or blade outer air seal components and backing plate components. The outer case provides an outer radial boundary of the axial flow path. The ring segment components or blade outer air seal components and backing plate components are aligned and suspended in close proximity to blade tips of the rotating blade components to limit flow between the blade tips and the outer case. The ring segment components or blade outer air seal components and backing plate components are typically disposed adjacent to one another such that small gaps are formed therebetween.

It is desirable to prevent flow of hot combustion gases through the gaps between the adjacent components to prevent performance loss and, in particular, to prevent or limit exposure of the ring segment components and backing plate components directly to the hot combustion gases.

Some current seal designs and assemblies include sealing members such as metal strips disposed in slots which may be formed in the components. Because of the typical slot configuration, stresses are generated at relatively sharp edges. Additionally, variations in pressure forces within the engine tend to move or vibrate the components. The variable pressure may induce circumferential, radial, and/or axial movement of the components during engine operation. Accordingly, seal assemblies must be designed to tolerate such movement of the components.

Metallic type materials used to form the components have mechanical properties including strength and ductility sufficiently high to enable the components to receive and retain sealing members in the slots formed therein without resulting in substantial damage to the components during operation. However, current gas turbine engine development has suggested use of certain materials having a higher temperature capability than the metallic type materials. Such materials, such as ceramic matrix composite (CMC) or monolithic ceramic materials, have mechanical properties that must be considered during design and application of the engine components. CMC and monolithic ceramic type materials have relatively low tensile ductility or low strain to failure when compared with metallic materials. Components made from CMC or monolithic ceramic type materials, although having certain higher temperature capabilities than those of a metallic type material, may exhibit a lower tolerance to the stresses generated in the above described slots or recesses formed in the components.

In view of the foregoing considerations it would be desirable to provide a sealing element for use in a turbine engine having ceramic components, wherein the sealing element is retained in a gap formed between adjacent segments and is capable of accommodating high temperatures associated with a high velocity gas flow path of the turbine engine without substantial erosion and/or damage thereto.

SUMMARY OF THE INVENTION

In accordance with a first aspect of the present invention, a seal arrangement is provided for reducing seal gaps within a turbine engine including a circumferentially extending structure having an axially extending surface forming a gas flow path extending parallel to an axis of the turbine engine. The seal arrangement comprises a plurality of circumferentially disposed segments defining the circumferentially extending structure. Each segment including an axially forward circumferential edge, an axially aft circumferential edge, and a pair of circumferentially spaced axial edges extending between the forward and aft edges. A surface portion comprising a portion of the axially extending surface extends between the forward and aft circumferential edges and between the pair of axial edges, the surface portion extending generally parallel to the axis of the turbine engine in contact with high velocity gases flowing therethrough, and each axial edge comprising a radial surface extending radially from the surface portion. The segments are arranged such that a gap is defined between facing axial edges of adjacent ones of the segments. A sealing element extends within the gap from the surface portions of the adjacent segments radially along at least a portion of the facing axial edges. The sealing element comprising a compliant material in the circumferential direction to span the gap during reduction and expansion of the gap. The sealing element is non-homogeneous and includes a first layer and a second layer. At least a portion of the second layer defines a protective erosion resistant surface located adjacent to and spanning between the surface portions of the adjacent segments.

In accordance with a second aspect of the present invention, a seal arrangement is provided for reducing seal gaps within a turbine engine including a circumferentially extending structure having an axially extending surface forming a gas flow path extending parallel to an axis of the turbine engine. The seal arrangement comprises a plurality of circumferentially disposed segments defining the circumferentially extending structure. Each segment includes an axially forward circumferential edge, an axially aft circumferential edge, and a pair of circumferentially spaced axial edges extending between the forward and aft edges. A surface portion comprising a portion of the axially extending surface extends between the forward and aft circumferential edges and between the pair of axial edges. The surface portion extends generally parallel to the axis of the turbine engine and is in contact with high velocity gases flowing therethrough. Each axial edge comprises a radial surface extending radially from the surface portion. The segments are arranged such that a gap is defined between facing axial edges of adjacent ones of the segments. A sealing element extends within the gap from the surface portions of the adjacent segments radially along at least a portion of the facing axial edges. The sealing element comprises a compliant material in the circumferential direction to span the gap during reduction and expansion of the gap. The sealing element comprises a first layer and a second layer. The first layer comprises a ceramic felt and at least a portion of the second layer defines a protective erosion resistant surface located adjacent to and spanning between the surface portions of the adjacent segments. Each of the adjacent segments comprises a ceramic material and the seal element is bonded to at least one of the facing axial edges.

In accordance with a third aspect of the present invention, a seal arrangement is provided for reducing seal gaps within a turbine engine including a circumferentially extending structure having an axially extending surface forming a gas flow path extending parallel to an axis of the turbine engine. The seal arrangement comprises a plurality of circumferentially disposed segments defining the circumferentially extending structure. Each segment includes an axially forward circumferential edge, an axially aft circumferential edge, and a pair of circumferentially spaced axial edges extending between the forward and aft edges. A surface portion comprising a portion of the axially extending surface extends between the forward and aft circumferential edges and between the pair of axial edges. The surface portion extends generally parallel to the axis of the turbine engine and is in contact with high velocity gases flowing therethrough. Each axial edge comprises a radial surface extending radially from the surface portion. The segments are arranged such that a gap is defined between facing axial edges of adjacent ones of the segments. A sealing element extends within the gap from the surface portions of the adjacent segments radially along at least a portion of the facing axial edges. The sealing element comprises a compliant material in the circumferential direction to span the gap during reduction and expansion of the gap. The sealing element comprises a corrugated seal located adjacent to and spanning between the surface portions of the adjacent segments.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3 is an enlarged cut-away perspective view of a sealing arrangement illustrated in FIG. 2;

FIG. 4 is an enlarged axial view of the sealing arrangement illustrated in FIG. 2;

FIG. 5 is an enlarged cross-sectional axial view of a sealing arrangement in accordance with another embodiment of the invention;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
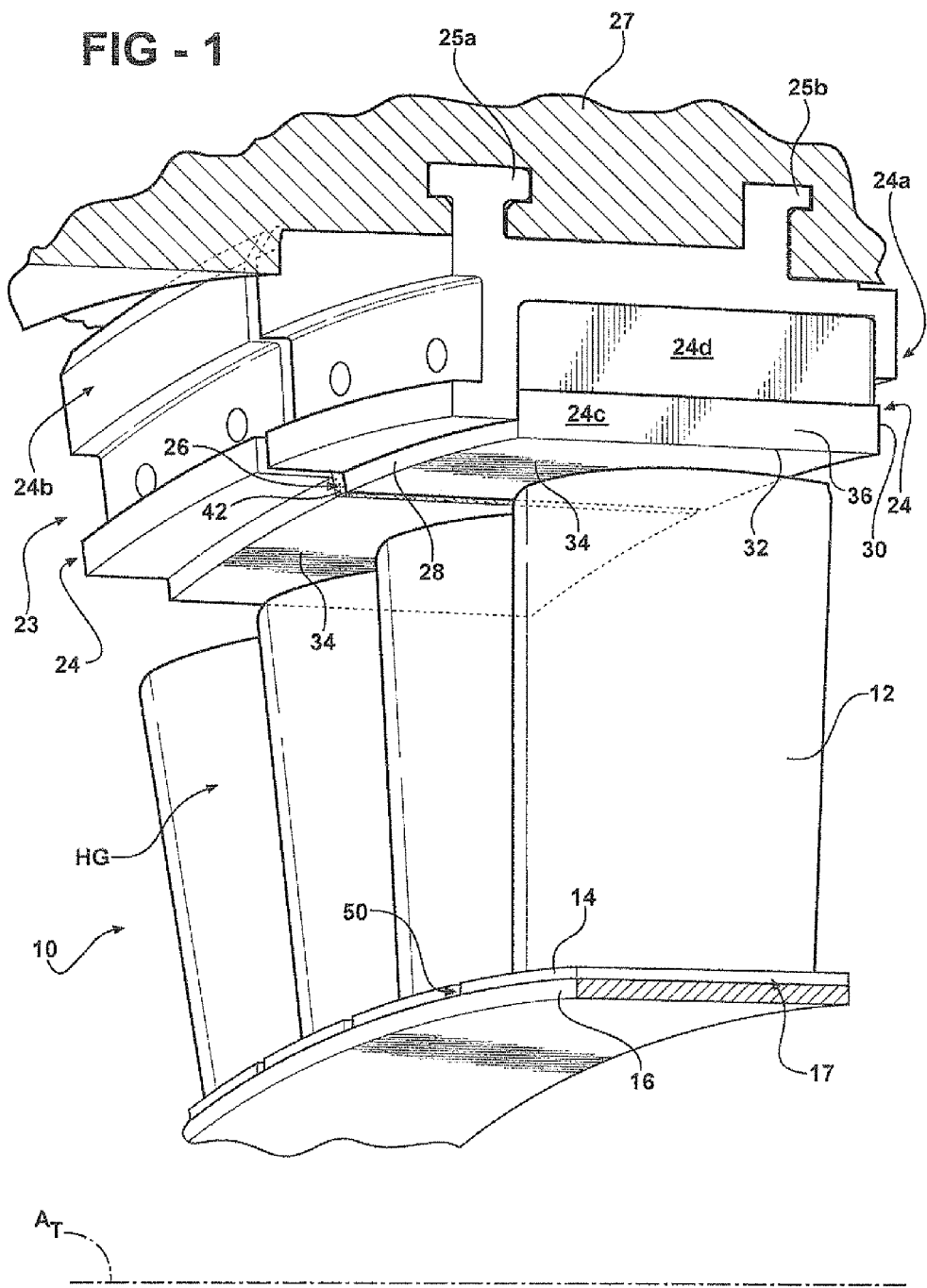
FIG. 1 is a perspective partial view of a stage of a turbine engine in accordance with an embodiment of the invention.

According to aspects of the present invention, FIG. 1 illustrates a portion of a stage 10 of a turbine engine. The stage 10 is disposed in a hot gas flow path HG of the engine and includes a plurality of rotating components illustrated as blades 12, and a plurality of non-rotating stationary components (not shown), such as vanes, circumferentially disposed about a turbine axis $A_T$.

Typically, the turbine engine includes a plurality of stages, each including a plurality of blades 12 and a plurality of vanes. Each of the blades 12 is typically mounted on a blade shroud segment 14. The blade shroud segments 14 may be mounted on the circumference of a turbine disc 16 and may be assembled into rows 17 as shown in FIG. 1. The vanes are typically mounted at radially inner ends to inner vane shroud segments (not shown), and at radially outer ends to outer vane shroud segments (not shown). The vane shroud segments may be assembled into rows which, together with the blades 12 and blade shroud segments 14 form the stages of the turbine engine.

In the embodiment shown, a circumferentially extending structure 23 comprising a plurality of circumferential ring segment assemblies 24 (two shown in FIG. 1) at least partially forms an outer boundary of the hot gas flow path HG. The ring segment assemblies 24 each comprise a rectangular ceramic ring segment 24a or outer edge seal and a backing plate segment 24b that defines a support for the ring segment 24. Each ceramic ring segment 24a in the embodiment shown comprises a first portion 24c and a second portion 24d. The first portion 24c is formed, for example, from a ceramic matrix composite (CMC). The first portion 24c is disposed radially inwardly from the second portion 24d, which is also formed, for example, from a CMC. It is understood that the ceramic ring segments 24a could be formed from a single piece of material without departing from the scope and spirit of the invention. Each backing plate segment 24b in the embodiment shown is formed from a metal, such as a nickel alloy, for example, and includes a front attachment flange 25a and a rear attachment flange 25b. The attachment flanges 25a, 25b engage with surfaces of a blade ring 27 to mount the ring segment assemblies 24 to the blade ring 27. The blade ring 27 surrounds the ring segment assemblies 24 and is supported within an outer casing (not shown) of the engine.

Figure 2:
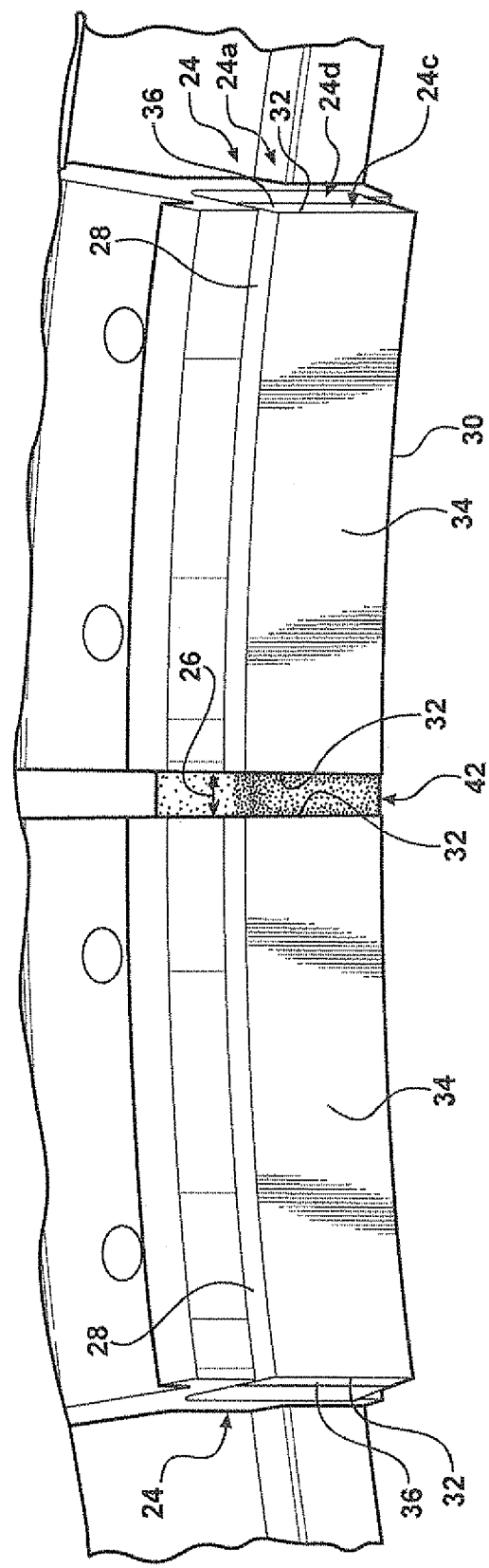
FIG. 2 is a radial view of a sealing arrangement in accordance with an embodiment of the invention.

Referring to FIGS. 2 and 3, each ceramic ring segment 24a includes an axially forward circumferential edge 28, an axially aft circumferential edge 30, and a pair of circumferentially spaced axial edges 32 that extend between the forward circumferential edge 28 and the aft circumferential edge 30. Each ceramic ring segment 24a has a surface portion 34 that extends generally parallel to the turbine axis $A_T$, as shown in FIG. 1. The surface portion 34 of each ceramic ring segment 24a spans between the forward circumferential edge 28, the aft circumferential edge 30, and the pair of axial edges 32. The surface portions 34 of the ceramic ring segments 24a cooperate to form a portion of the outer boundary of the hot gas flow path HG adjacent to the blade row 17. Each of the axial edges 32 includes a radial surface 36 that extends radially outwardly from the surface portion 34 of each ceramic ring segment 24a. The radial surfaces 36 of the axial edges 32 extend generally perpendicular to the turbine axis $A_T$.

The ring segment assemblies 24 may be positioned so that axially extending seal gaps 26 are formed between adjacent ring segment assemblies 24. The radial surfaces 36 of the axial edges 32 of adjacent ceramic ring segments 24a define facing surfaces that cooperate to define interior portions of the gaps 26 between adjacent ceramic ring segments 24a. In a typical embodiment, the gaps 26 are approximately two millimeters wide, although it is understood that the widths of the gaps 26 may vary depending on the size of the turbine or the arrangement of the ceramic ring segments 24a. It is also understood that the widths of the gaps 26 will vary with thermal changes within the engine and with movement of the ring segment assemblies 24 in the circumferential, radial, and axial directions.

Referring to FIGS. 3 and 4, a sealing arrangement 40 for at least partially filling the gap 26 between adjacent ring segment assemblies 24 in accordance with an embodiment of the invention is shown. The sealing arrangement 40 comprises a sealing element 42 that extends within the gap 26 extending radially outwardly from the surface portions 34 of adjacent ceramic ring segments 24a. The sealing element 42 extends along the axial edges 32 and between the radial surfaces 36 of the adjacent ceramic ring segments 24a to at least partially fill the interior portion of the gap 26. In a preferred construction of the described embodiment, the sealing element 42 may be compressed between adjacent ceramic ring segments 24a. For example, the ceramic ring segments 24a illustrated in FIGS. 1-4 may be arranged so that a compressed thickness T of the sealing element 42 is reduced to ⅓ of an uncompressed thickness of the sealing element 42. Additionally, part of the sealing element 42 may be adhered to the axial edge 32 or the radial surface 36 of at least one of the adjacent ceramic ring segments 24a.

In the embodiment shown, the sealing element 42 is formed from a compliant non-woven fibrous material comprising a ceramic felt material, such as RS-3000 felt, available from Zircar Refractory Composites, Inc. of Florida, N.Y. The sealing element 42 is configured as a non-homogenous structure and comprises a first layer 44 and a second layer 46, as seen in FIGS. 3 and 4. The first layer 44 comprises a portion of the ceramic felt material disposed on a radially outer side of the second layer 46. In the embodiment shown, the second layer 46 comprises a portion of the ceramic felt material that is infiltrated with a heat tolerant hardener to structurally bind together the fibers of the ceramic felt material at the surface of the sealing element 42. The hardener preferably comprises an alumina slurry, such as a highly dilute alumina slurry based on aluminum hydroxychloride (AlOCl) alumina precursor. In a specific example an alumina slurry comprising 80% AlOCl: 20% SM-8 may be used, although other hardeners may also be used within the scope of the present invention. The infiltrated portion defining the second layer 46 comprises a protective erosion resistant surface 48 that is located adjacent to and spans between the surface portions 34 of the adjacent ceramic ring segments 24a. In a preferred embodiment, the hardener is infiltrated into the ceramic felt material of the sealing element 42 in-situ in the engine. However, it is understood that the hardener may be infiltrated into the ceramic felt material before the sealing element 42 is in place between adjacent ceramic ring segments 24a. For example, the hardener may be applied to an edge of the ceramic felt material of the sealing element 42 and then pre-cured in a furnace (not shown) before the sealing element 42 is placed between adjacent ceramic ring segments 24a.

The erosion resistant surface 48 of the sealing element 42 is configured to be in direct contact with the hot gases passing in the axial direction through the hot gas flow path HG and cooperates with the surface portions 34 of the ceramic ring segments 24a to form a circumferentially extending outer boundary of the hot gas flow path HG adjacent to the blade row 17. The hardened second layer 46, including the erosion resistant surface 48, defines a protective layer of sealing element 42, protecting the compliant fibrous (non-hardened) first layer 44 from the erosive effects of the high velocity combustion gases flowing through the hot gas flow path HG.

As noted above, the size of the gap 26 between the ring segment assemblies 24 may vary with movement of the ring segment assemblies 24 in the circumferential, radial, and axial directions. For example, thermal growth of the engine, and in particular thermal movement of the blade ring 27, may cause the size of the gap 26 between ring segment assemblies 24 to increase and decrease with varying operating conditions of the engine.

As discussed above, the compliant material of the sealing element 42 may be affixed, such as by an adhesive, to one or both of the facing radial surfaces 36 of the adjacent ceramic ring segments 24a such that the sealing element 42 is retained within the gap 26 as the gap size changes. To accommodate these variations in the size of the gap 26, the compliant material used to form the sealing element 42 expands and contracts. Specifically, as the circumferential size of the gap 26 increases, the compliant material forming the sealing element 42 expands to span the gap 26. Conversely, as the circumferential size of the gap 26 decreases, the compliant material forming the sealing element 42 contracts to span the gap 26.

The compliant characteristic that is provided by the first layer 44 particularly accommodates variations in the size of the gap, while the hardened second layer 46 operates to prevent or limit deterioration of the sealing element 42 during operation of the engine. Further, the compliant characteristic of the sealing element 42 functions to substantially avoid stresses at contact points with the ceramic ring segments 24a. By compliantly accommodating variations in the widths of the gaps 26, the sealing elements 42 substantially limit the hot gases in the hot gas flow path HG from flowing in the axial direction between adjacent ring segment assemblies 24 and limit a radial outward flow of hot gases from the gas flow path HG.

FIG. 5 shows a sealing arrangement 140 in accordance with another embodiment of the invention. The sealing arrangement 140 is disposed at an interface between adjacent ceramic ring segments 24a for at least partially filling the gap 26 between the adjacent ceramic ring segments 24a, as discussed above with reference to the embodiment of FIG. 1. The sealing arrangement 140 comprises a sealing element 142 that extends within the gap 26 extending radially outwardly from the surface portions 34 of adjacent ceramic ring segments 24a. The sealing element 142 extends along the axial edges 32 and between the radial surfaces 36 of the adjacent ceramic ring segments 24a to at least partially fill the interior portion of the gap 26. In a preferred embodiment of the sealing arrangement 140, the sealing element 142 may be compressed between the adjacent ceramic ring segments 24a. For example, the ceramic ring segments 24a may be arranged so that a compressed thickness $T_2$ of the sealing element 142 is reduced to ⅓ of an uncompressed thickness of the sealing element 142. Additionally, part of the sealing element 142 may be adhered to the axial edge 32 or the radial surface 36 of at least one of the adjacent ceramic ring segments 24a.

In the embodiment shown, the sealing element 142 comprises a first layer 144 and a second layer 146. The first layer 144 is formed from a compliant non-woven fibrous material comprising a ceramic felt material, such as RS-3000 felt described above for FIGS. 2-4. The second layer 146 may comprise a heat tolerant woven or braided layer of material, such as Nextel 610 or Nextel 720, for example. The second layer 146 defines a protective erosion resistant surface 148 that is located adjacent to and spans between the surface portions 34 of the adjacent ceramic ring segments 24a. The erosion resistant surface 148 of the sealing element 142 is in direct contact with the hot gas flow path HG and cooperates with the surface portions 34 of the ceramic ring segments 24a to at least partially form the circumferentially extending outer boundary of the hot gas flow path HG. As seen in FIG. 5, the second layer 146 surrounds or encapsulates the first layer 144. Further, the portion of the second layer 146 defining the erosion resistant surface 148 is located radially inwardly from the location of the radial inner-most edge 147 of the first layer 144 and spans between the facing surfaces 36 of the adjacent ceramic ring segments 24a to protect the material of the first layer 144 from direct exposure to the high velocity gases within the hot gas flow path HG.

It should be noted that the sealing element 142 according to the embodiment of FIG. 5 may comprise the material of the second layer 146 only, wherein the first layer 144 would be removed. In this form, the second layer 146 could comprise a single heat tolerant woven layer of material, or a plurality of heat tolerant woven layers of material.

As noted above, the size of the gap 26 between the ring segment assemblies 24 may vary with movement of the ring segment assemblies 24 in the circumferential, radial, and axial directions. For example, thermal growth of the engine, and in particular thermal movement of the blade ring 27, causes the size of the gap 26 between ring segment assemblies 24 to increase and decrease with varying operating conditions of the engine. To accommodate these variations in the size of the gap 26, the compliant material used to form the first layer 144 of the sealing element 142 expands and contracts. Specifically, as the circumferential size of the gap 26 increases, the compliant material forming the first layer 144 of the sealing element 142 expands to span the gap 26. Conversely, as the circumferential size of the gap 26 decreases, the compliant material forming the first layer 144 of the sealing element 142 contracts to span the gap 26.

As discussed above, the second layer 146 of the sealing element 142 may be affixed, such as by an adhesive, to one or both of the facing radial surfaces 36 of the adjacent ceramic ring segments 24a such that the sealing element 142 is retained within the gap 26 as the gap size changes. The compliant characteristic that is provided by the first layer 144 of the sealing element 142 particularly accommodates variations in the size of the gap and expands and contracts to fill the space defined within the second layer 146, while the heat tolerant characteristic of the second layer 146 of the sealing element 142 operates to prevent or limit deterioration of the sealing element 142 during operation of the engine. Further, the compliant characteristic of the first layer 144 of the sealing element 142 functions to substantially avoid stresses at contact points with the ceramic ring segments 24a. By compliantly accommodating variations in the widths of the gaps 26, the sealing elements 142 substantially limit the hot gases in the hot gas flow path HG from flowing in the axial direction between adjacent ring segment assemblies 24 and limit a radial outward flow of hot gases from the gas flow path HG.

Figure 6:
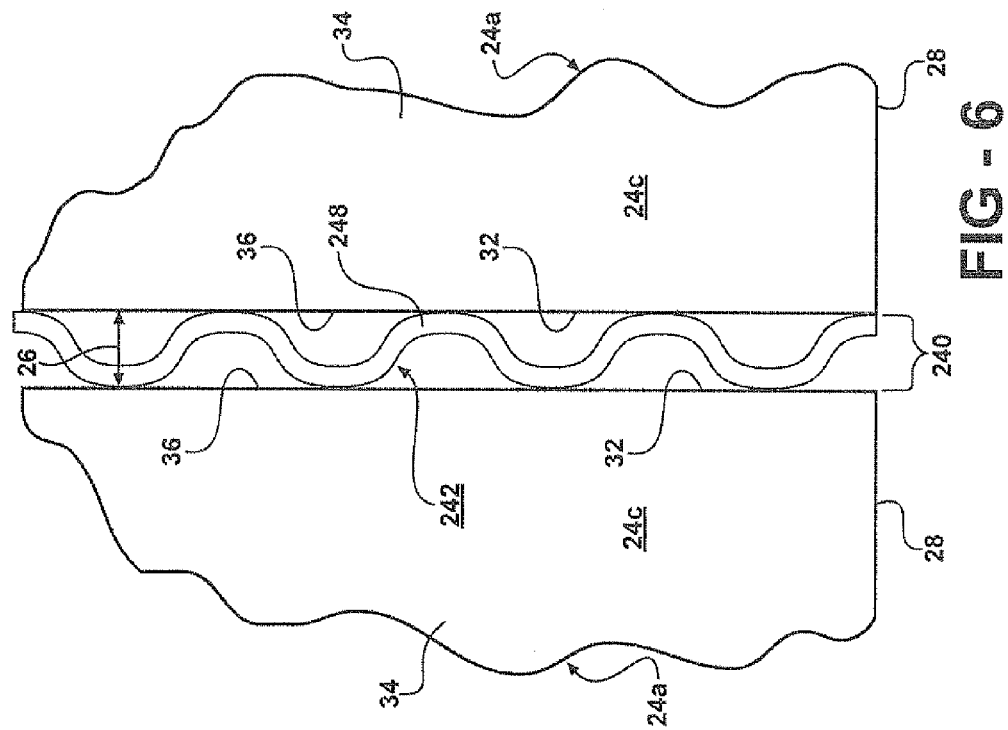
FIG. 6 is an enlarged radial view of a sealing arrangement in accordance with another embodiment of the invention.

FIG. 6 shows a sealing arrangement 240 in accordance with another embodiment of the invention. The sealing arrangement 240 is disposed at an interface between adjacent ceramic ring segments 24a for at least partially filling the gap 26 between adjacent ceramic ring segments 24a, as discussed above with reference to the embodiment of FIG. 1. The sealing arrangement 240 comprises a sealing element 242 that extends within the gap 26 extending radially outwardly from the surface portions 34 of adjacent ceramic ring segments 24a. The sealing element 242 extends along at least a portion of the axial edges 32 and between the radial surfaces 36 of the adjacent ceramic ring segments 24a. In a preferred embodiment of the sealing arrangement 240, part of the sealing element 242 may be adhered to the axial edge 32 or the radial surface 36 of at least one of the adjacent ceramic ring segments 24a.

In the embodiment shown, the sealing element 242 comprises a heat tolerant, corrugated material, such as, for example, a ceramic matrix composite (CMC) or an oxide dispersion strengthened super alloy that is capable of a certain degree of resilient flexure. The sealing element 242 is located adjacent to and spans between the surface portions 34 of the adjacent ceramic ring segments 24a. In the embodiment shown, corrugations of the sealing elements 242 extend in the radial direction. If desired, the corrugations of the sealing element 242 may be angled in a plane in the axial direction. The sealing element 242 defines a protective erosion resistant surface 248 that is located adjacent to and spans between the surface portions 34 of the adjacent ceramic ring segments 24a. The erosion resistant surface 248 of the sealing element 242 is in direct contact with the hot gas flow path HG and cooperates with the surface portions 34 of the ceramic ring segments 24a to at least partially form the circumferentially extending outer boundary of the hot gas flow path HG.

As noted above, the size of the gap 26 between the ring segment assemblies 24 may vary with movement of the ring segment assemblies 24 in the circumferential, radial, and axial directions. For example, thermal growth of the engine, and in particular thermal movement of the blade ring 27, may cause the size of the gap 26 between ring segment assemblies 24 to increase and decrease with varying operating conditions of the engine. To accommodate these variations in the size of the gap 26, the sealing element 242 expands and contracts within the gap 26. Specifically, as the circumferential size of the gap 26 increases, the sealing element 242 flexes outwardly to span the gap 26. Conversely, as the circumferential size of the gap 26 decreases, the sealing element 242 flexes inwardly to span the gap 26.

As discussed above, the sealing element 242 may be affixed, such as by an adhesive or a mechanical attachment such as a bolt or other mechanical fastener, to one or both of the facing radial surfaces 36 of the adjacent ceramic ring segments 24a such that the sealing element 242 is retained within the gap 26 as the gap size changes. The flexible characteristic of the sealing element 242 accommodates variations in the size of the gap, while the heat tolerant characteristic of the material forming the sealing element 242 operates to prevent or limit deterioration of the sealing element 242 during operation of the engine. Further, the flexible characteristic of the sealing element 242 functions to substantially avoid stresses at contact points with the ceramic ring segments 24a. By compliantly accommodating variations in the width of the gap 26, the sealing element 242 is configured to substantially limit the hot gases in the hot gas flow path HG from flowing in the axial direction between adjacent ring segment assemblies 24. It is understood that additional seals, including sealing elements such as those described with reference to FIGS. 1-5, may be disposed radially outwardly from the sealing element 242 to span the gap 26 and prevent a radial outward flow of hot gases from the hot gas flow path HG.

Figure 7:
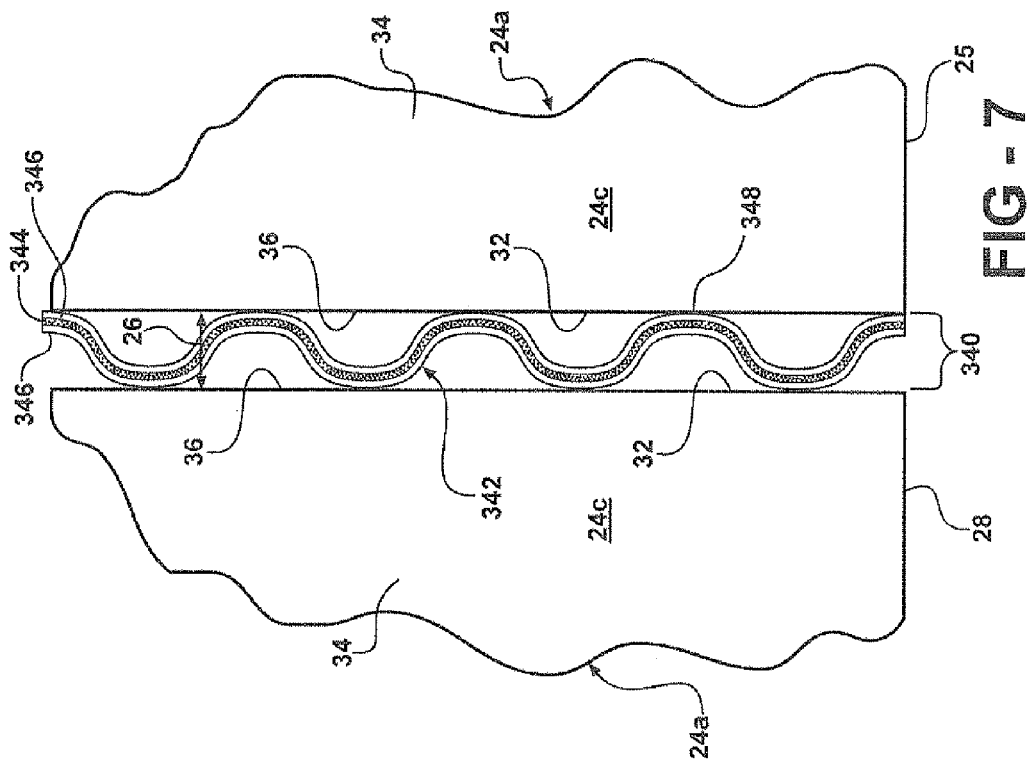
FIG. 7 is an enlarged radial view of a sealing arrangement in accordance with another embodiment of the invention.

FIG. 7 shows a sealing arrangement 340 in accordance with another embodiment of the invention. The sealing arrangement 340 is disposed at an interface between adjacent ceramic ring segments 24a for at least partially filling the gap 26 between adjacent ceramic ring segments 24a, as discussed above with reference to the embodiment of FIG. 1. The sealing arrangement 340 comprises a sealing element 342 that extends within the gap 26 extending radially outwardly from the surface portions 34 of adjacent ceramic ring segments 24a. The sealing element 342 extends along at least a portion of the axial edges 32 and between the radial surfaces 36 of the adjacent ceramic ring segments 24a. Preferably, part of the sealing element 342 may be adhered to the axial edge 32 or the radial surface 36 of at least one of the adjacent ceramic ring segments 24a.

In the embodiment shown, the sealing element 342 comprises a first layer 344 and a pair of second layers 346. The first layer 344 is formed from a compliant non-woven fibrous material comprising a ceramic felt material, such as RS-3000 felt described above for FIGS. 2-4. The second layers 346 may comprise a heat tolerant, corrugated material, such as, for example, a ceramic matrix composite (CMC) or an oxide dispersion strengthened super alloy. In the embodiment shown in FIG. 7, corrugations of the second layers 346 of the sealing element 342 extend in the radial direction and the second layers 346 sandwich the first layer 344 therebetween. If desired, the corrugations of the second layers 346 of the sealing element 342 may be angled in a plane in the axial direction. The second layers 346 of the sealing element 342 includes radially inner edge portions that define a protective erosion resistant surface 348 that is located adjacent to and spans between the surface portions 34 of the adjacent ceramic ring segments 24a. The erosion resistant surface 348 of the sealing element 342 is in direct contact with the hot gas flow path HG and cooperates with the surface portions 34 of the ceramic ring segments 24a to at least partially form the circumferentially extending outer boundary of the hot gas flow path HG. Further, the portion of the second layers 346 defining the erosion resistant surface 348 limit exposure of the material of the first layer 344 from direct exposure to the high velocity gases within the hot gas flow path HG. That is, the high velocity gases will generally flow perpendicular to the edges of the second layers 346 defining the erosion resistant surface 348, such that the high velocity gases substantially impinge on the edges of the second layers 346, rather than on the first layer 344 located therebetween.

As noted above, the size of the gap 26 between the ring segment assemblies 24 may vary with movement of the ring segment assemblies 24 in the circumferential, radial, and axial directions. For example, thermal growth of the engine, and in particular thermal movement of the blade ring 27, may cause the size of the gap 26 between ring segment assemblies 24 to increase and decrease with varying operating conditions of the engine. To accommodate these variations in the size of the gap 26, the compliant material used to form the first layer 344 of the sealing element 342 may expand and contract. In addition, the second layers 346 may flex inwardly and outwardly to accommodate changes in the size of the gap 26.

As discussed above, one or both of the second layers 346 of the sealing element 342 may be affixed, such as by an adhesive or a mechanical attachment such as a bolt or other mechanical fastener, to the facing radial surfaces 36 of the adjacent ceramic ring segments 24a such that the sealing element 342 is retained within the gap 26 as the gap size changes. The compliant characteristics that are provided by the materials forming the layers 344, 346 of the sealing element 342 particularly accommodate variations in the size of the gap, while the heat tolerant characteristic of the material forming the second layers 346 of the sealing element 342 operates to provide a protective structure around the first layer 346 to prevent or limit deterioration of the sealing element 342 during operation of the engine. Further, the compliant and flexible characteristics of the materials forming the layers 344, 346 of the sealing element 342 function to substantially avoid stresses at contact points with the ceramic ring segments 24a. By compliantly accommodating variations in the width of the gap 26, the sealing element 342 substantially limits the hot gases in the hot gas flow path HG from flowing in the axial direction between adjacent ring segment assemblies 24. In addition, as described above, additional seals may be disposed radially outwardly from the sealing element 342 to span the gap 26 and prevent a radial outward flow of hot gases from the hot gas flow path HG.

Use of the sealing elements 42, 142, 242, 342 to span the gaps 26 between adjacent ceramic ring segments 24a facilitates use of low ductility materials, such as, for example, ceramic materials, for selected components of the turbine engine. Specifically, the compliant and flexible materials used to form the sealing elements 42, 142, 242, 342 permit an expansion and contraction of the sealing elements 42, 142, 242, 342 as the gaps 26 formed between adjacent ring segment assemblies 24 expand and contract due to temperature variations in and around the hot gas flow path HG. Additionally, as the portions of the sealing elements 42, 142, 242, 342 exposed to the hot gas flow path HG are formed from or include heat tolerant materials, the sealing elements 42, 142, 242, 342 can be exposed to the high temperatures in and around the hot gas flow path HG without substantial erosion and damage thereto.

The embodiments of the invention described above for FIGS. 2-7 have illustrated sealing arrangements 40, 140, 240, 340 for at least partially filling gaps 26 between adjacent ceramic ring segments 24a. However, it is understood that sealing arrangements for at least partially sealing other gaps within the turbine engine could be provided using the teachings provided herein. For example, the present invention may be implemented to fill a gap 50, see FIG. 1, at an interface between adjacent blade shroud segments 14, or similarly may be implemented to fill a gap formed at an interface between adjacent vane shroud segments. Additionally, two or more of the embodiments disclosed above could be combined in a single application. For example, the ceramic felt material forming the first layer 344 of the sealing element 342 of FIG. 7 may be infiltrated with a hardener as disclosed in the embodiment of FIGS. 2-4.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal arrangement for reducing seal gaps within a turbine engine including a circumferentially extending structure having an axially extending surface forming a gas flow path extending parallel to an axis of said turbine engine, said seal arrangement comprising:

a plurality of circumferentially disposed segments defining said circumferentially extending structure, each said segment including:

an axially forward circumferential edge, an axially aft circumferential edge, and a pair of circumferentially spaced axial edges extending between said forward and aft edges;

a surface portion comprising a portion of said axially extending surface and extending between said forward and aft circumferential edges and between said pair of axial edges, said surface portion extending generally parallel to said axis of said turbine engine in contact with high velocity gases flowing therethrough; and each said axial edge comprising a radial surface extending radially from said surface portion;

said segments arranged such that a gap is defined between facing axial edges of adjacent ones of said segments;

a sealing element extending within said gap from said surface portions of said adjacent segments radially along at least a portion of said facing axial edges, said sealing element comprising a compliant material in the circumferential direction to span said gap during reduction and expansion of said gap; and wherein said sealing element is non-homogeneous including a first layer and a second layer, said first layer comprising a non-woven fibrous layer compressed in the circumferential direction between said facing axial edges to a thickness reduced from its uncompressed thickness and at least a portion of said second layer defining a protective erosion resistant surface located adjacent to and spanning between said surface portions of said adjacent segments.

2. The seal arrangement of claim 1, wherein said first layer is radially displaced from said erosion resistant surface.

3. The seal arrangement of claim 1, wherein said non-woven fibrous layer comprises a ceramic felt.

4. The seal arrangement of claim 1, wherein said second layer of said sealing element comprises a woven layer of material.

5. The seal arrangement of claim 4, wherein said second layer of said sealing element is formed of one of Nextel 610 and Nextel 720.

6. The seal arrangement of claim 1, wherein said second layer comprises a portion of said non-woven fibrous material adjacent said surface portions infiltrated with a hardener, where said first layer comprises a portion of said non-woven fibrous material that does not include said hardener.

7. The seal arrangement of claim 6, wherein said hardener comprises at least one of an alumina slurry and an alumina precursor.

8. The seal arrangement of claim 1, wherein said non-woven fibrous layer is compressed between said facing axial edges to a thickness of about one-third the uncompressed thickness of said non-woven fibrous layer.

9. The seal arrangement of claim 1, wherein each of said adjacent segments comprises a ceramic material and said seal element comprises a ceramic material and is bonded to at least one of said facing axial edges.

10. A seal arrangement for reducing seal gaps within a turbine engine including a circumferentially extending structure having an axially extending surface forming a gas flow path extending parallel to an axis of said turbine engine, said seal arrangement comprising:

a plurality of circumferentially disposed segments defining said circumferentially extending structure, each said segment including:

an axially forward circumferential edge, an axially aft circumferential edge, and a pair of circumferentially spaced axial edges extending between said forward and aft edges;

a surface portion comprising a portion of said axially extending surface and extending between said forward and aft circumferential edges and between said pair of axial edges, said surface portion extending generally parallel to said axis of said turbine engine in contact with high velocity gases flowing therethrough; and each said axial edge comprising a radial surface extending radially from said surface portion;

said segments arranged such that a gap is defined between facing axial edges of adjacent ones of said segments;

a sealing element extending within said gap from said surface portions of said adjacent segments radially along at least a portion of said facing axial edges, said sealing element comprising a compliant material in the circumferential direction to span said gap during reduction and expansion of said gap; and wherein said sealing element comprises a first layer and a second layer, said first layer comprising a ceramic felt compressed in the circumferential direction between said facing axial edges to a thickness reduced from its uncompressed thickness, at least a portion of said second layer defining a protective erosion resistant surface located adjacent to and spanning between said surface portions of said adjacent segments, wherein each of said adjacent segments comprises a ceramic material and said seal element is bonded to at least one of said facing axial edges.

11. The seal arrangement of claim 10, wherein said first layer is radially displaced from said erosion resistant surface.

12. The seal arrangement of claim 11, wherein said second layer of said sealing element comprises a woven layer of material.

13. The seal arrangement of claim 10, wherein said second layer comprises a portion of said ceramic felt adjacent said surface portions infiltrated with a hardener, where said first layer comprises a portion of said ceramic felt that does not include said hardener.

14. The seal arrangement of claim 13, wherein said hardener comprises at least one of an alumina slurry and an alumina precursor.

15. The seal arrangement of claim 10, wherein said ceramic felt is compressed between said facing axial edges to a thickness of about one-third the uncompressed thickness of said ceramic felt.

16. A seal arrangement for reducing seal gaps within a turbine engine including a circumferentially extending structure having an axially extending surface forming a gas flow path extending parallel to an axis of said turbine engine, said seal arrangement comprising:

a plurality of circumferentially disposed segments defining said circumferentially extending structure, each said segment including:

an axially forward circumferential edge, an axially aft circumferential edge, and a pair of circumferentially spaced axial edges extending between said forward and aft edges;

a surface portion comprising a portion of said axially extending surface and extending between said forward and aft circumferential edges and between said pair of axial edges, said surface portion extending generally parallel to said axis of said turbine engine in contact with high velocity gases flowing therethrough; and each said axial edge comprising a radial surface extending radially from said surface portion;

said segments arranged such that a gap is defined between facing axial edges of adjacent ones of said segments;

a sealing element extending within said gap from said surface portions of said adjacent segments radially along at least a portion of said facing axial edges, said sealing element comprising a compliant material in the circumferential direction to span said gap during reduction and expansion of said gap;

wherein said sealing element comprises a corrugated seal located adjacent to and spanning between said surface portions of said adjacent segments; and wherein said sealing element is affixed to at least one of said facing axial edges.

17. The seal arrangement of claim 16, wherein said sealing element comprises a first corrugated CMC layer, a second corrugated CMC layer and a layer of ceramic felt disposed between said first corrugated CMC layer and said second corrugated CMC layer.

18. The seal arrangement of claim 16, wherein each of said adjacent segments comprises a ceramic material.

19. The seal arrangement of claim 16, wherein corrugations of said corrugated seal extend in the radial direction, and said corrugated seal is formed from one of a CMC and an oxide dispersion strengthened super alloy.

* * * * *